Dec. 30, 1958    W. WAHLI ET AL    2,866,630
APPARATUS FOR MEASURING ROTATIONAL SPEEDS
Filed Aug. 31, 1954    5 Sheets-Sheet 1

INVENTORS:
WERNER WAHLI
MARTIN A. BAUMANN
BY
*James ...*
ATTORNEYS

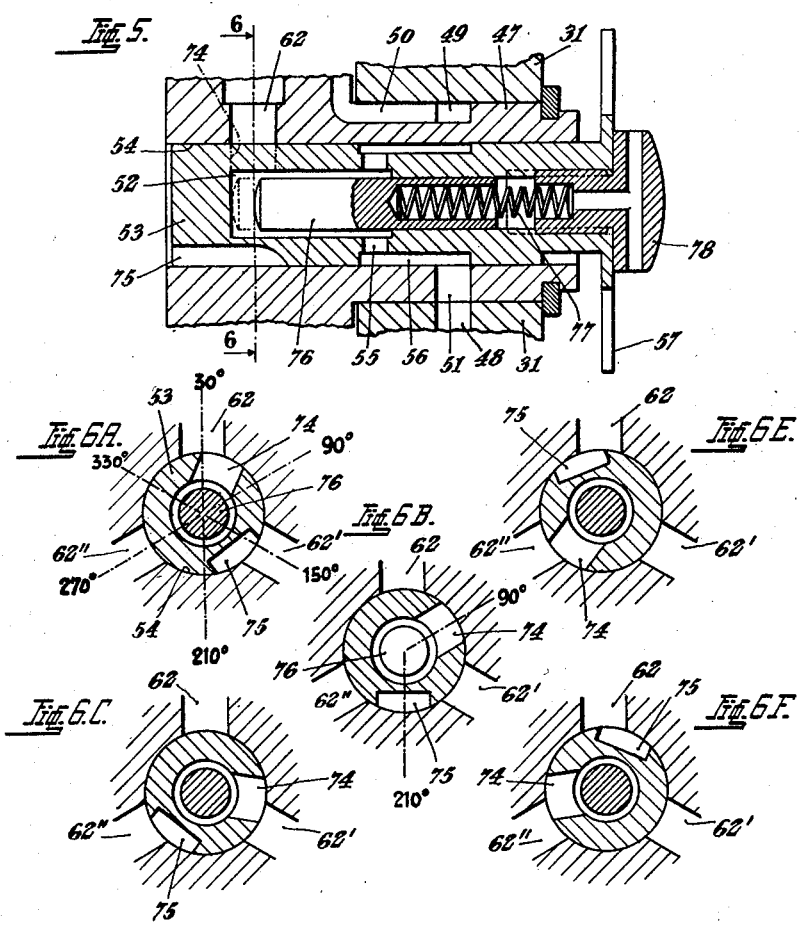
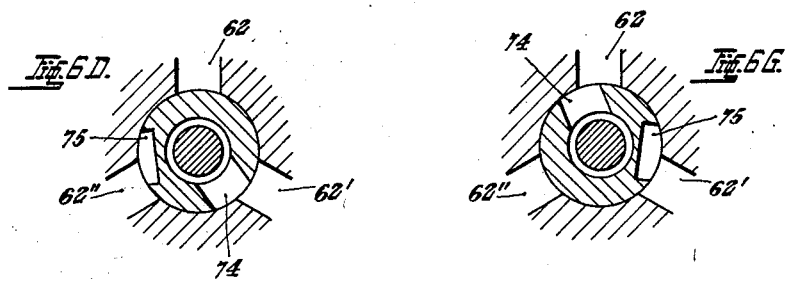
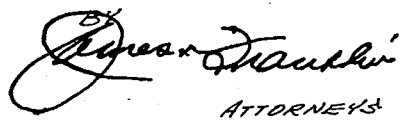

United States Patent Office 2,866,630
Patented Dec. 30, 1958

2,866,630

APPARATUS FOR MEASURING ROTATIONAL SPEEDS

Werner Wahli, Bern-Buempliz, and Martin A. Baumann, Bern-Liebefeld, Switzerland

Application August 31, 1954, Serial No. 453,324

17 Claims. (Cl. 264—1)

The prime object of the present invention is directed to an apparatus for measuring rotational speeds or velocities and comprises an improved apparatus or machine for the practice of the principles described and claimed in the patent to Wahli, No. 2,582,727, granted January 15, 1952.

In the apparatus of the present invention rotational speeds or velocities are measured by means of a liquid pump driven at a speed proportional to the rotational speed to be measured and discharging quantities of liquid through a control member, desirably in the form of a control valve, into a liquid measuring system responsive to the quantity of liquid thus discharged thereinto for operating a speed indicating device.

In carrying out this main object of the invention, the present invention comprises the provision of an improved apparatus for measuring rotational speeds primarily characterized by the following constructional principles.

(1) The liquid pump, the control valve and the liquid measuring system are all mounted in a liquid-tight casing provided with a liquid containing cavity, the liquid pump and the measuring system, connected for communication by the valve, being arranged within the liquid-tight casing for a liquid circulating communication with the said casing cavity.

(2) The apparatus for measuring the rotational speeds comprises a liquid pump discharging proportional to rotational speed to be measured and communicating on the discharge side through a periodically operating distributor valve alternately during time intervals of predetermined equal duration with a plurality of receiving measuring chambers or spaces provided for the measurement of the amount of liquid received per time interval and each volumetrically variably defined by a pair of cylindrically telescoping bodies; and (3) The said apparatus is characterized by such an arrangement of telescoping bodies of the body pairs serving to define the receiving spaces that the vertical projections of their axes of displacement on a certain plane define an equilateral polygon, and furthermore by the provision of a feeler or scanning member adapted to be rotated by the volumetrical variation of the receiving spaces and having its axis of rotation vertical to the said plane and passing through the center of the said polygon.

Figure 1:
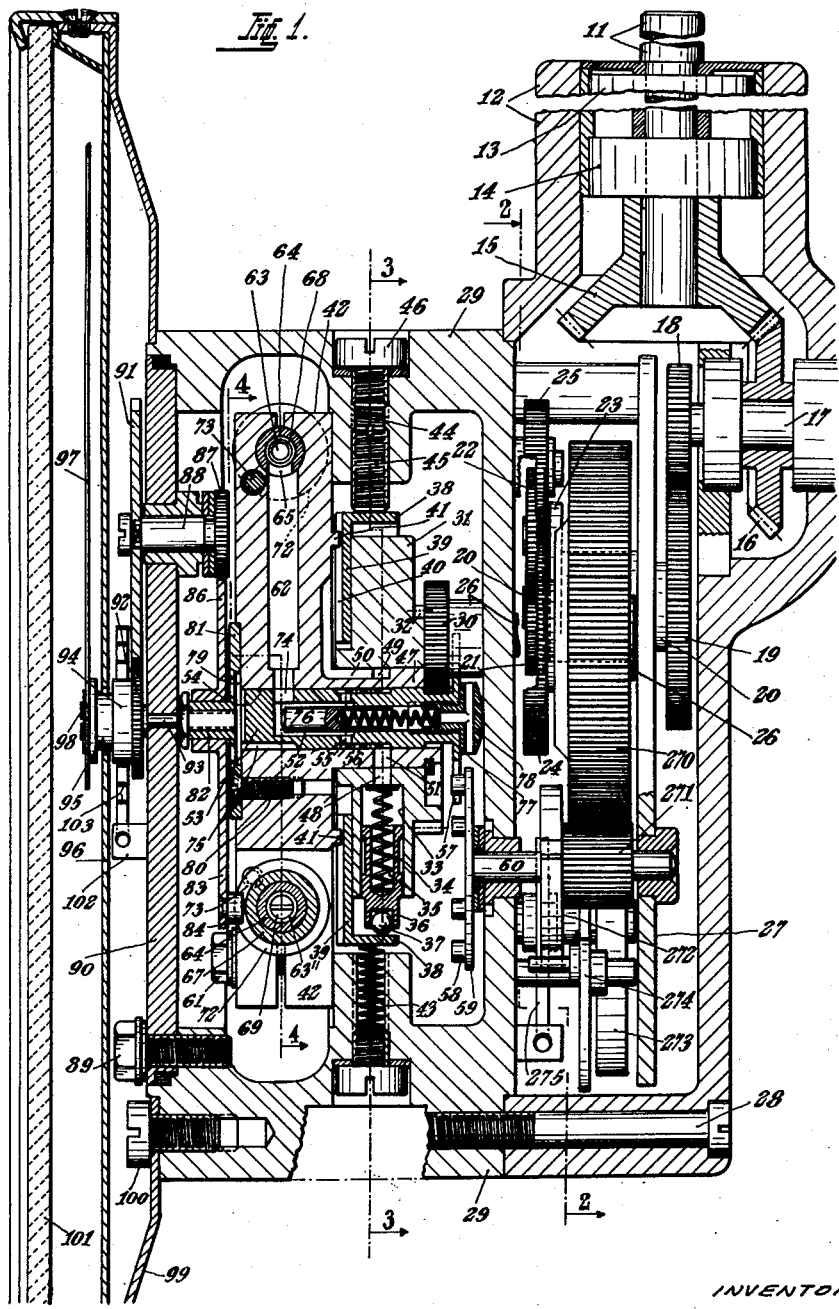
Figure 2:
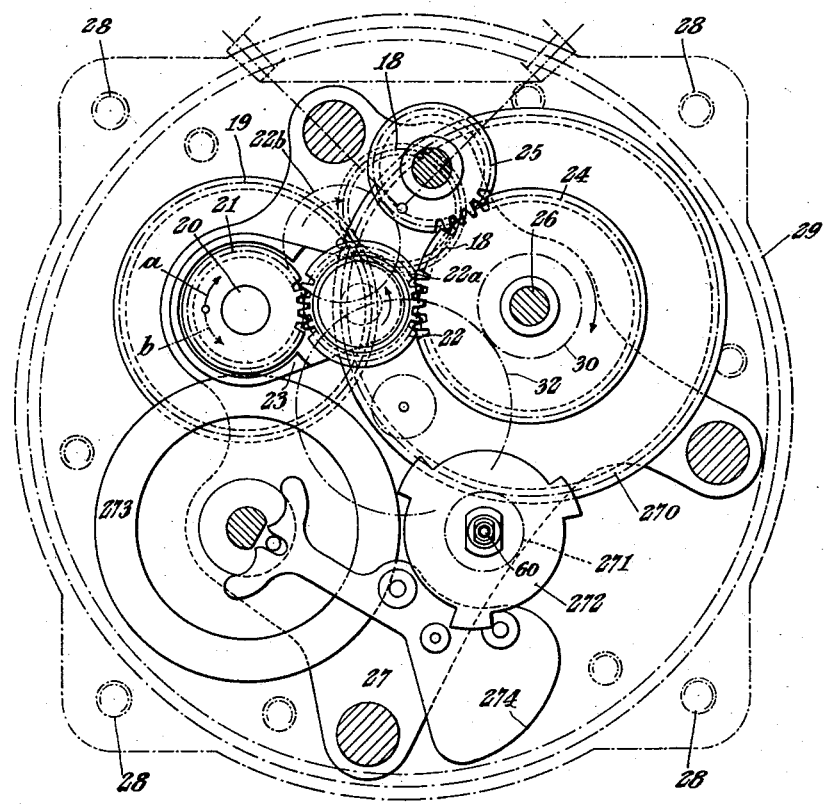
Figure 3:
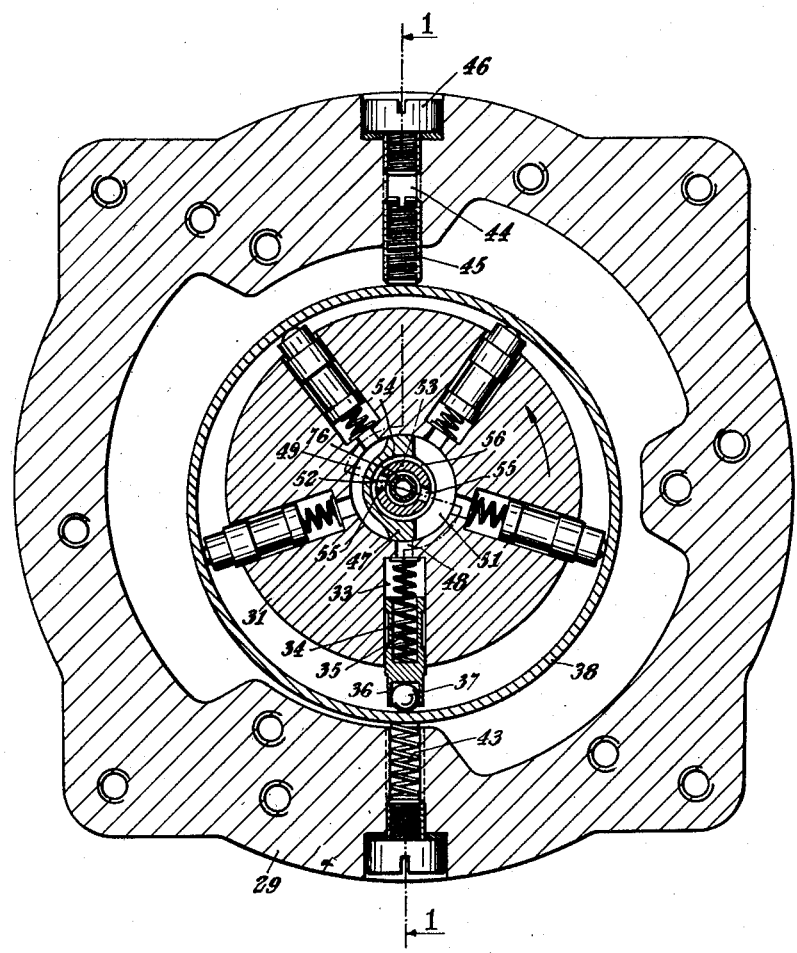
Figure 4:
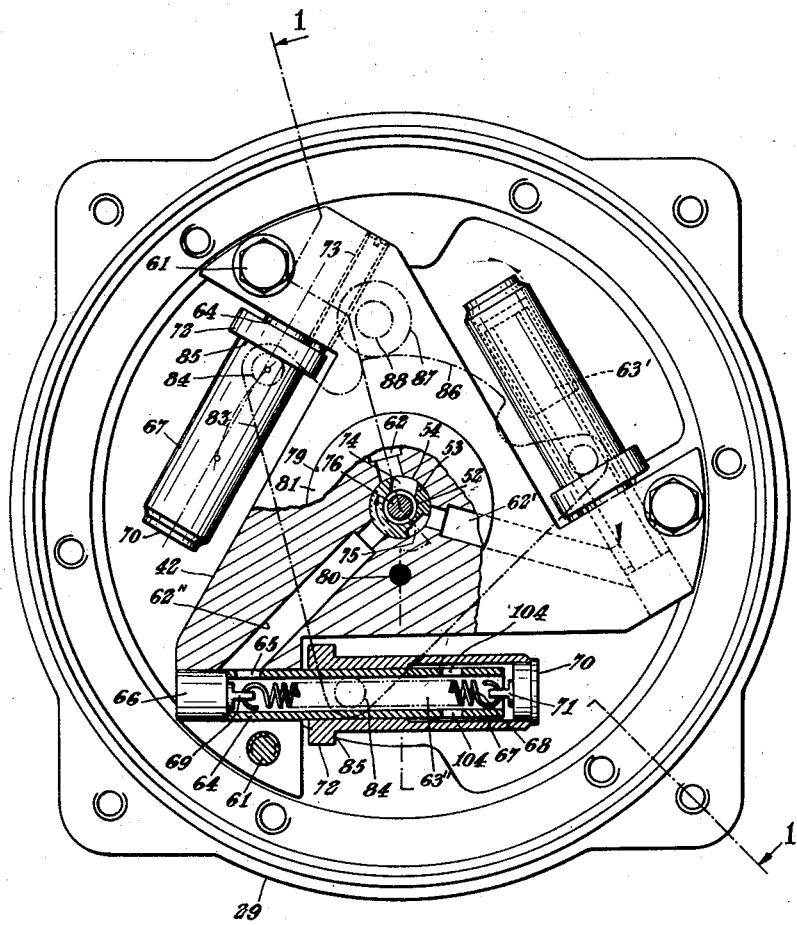

An embodiment of the present invention is shown in the accompanying drawings in which:

Fig. 1 shows an axial sectional view, taken in the plane 1—1 of Figs. 3 and 4, of an apparatus for measuring rotational speeds, parts of the drive of the apparatus and the clockwork being shown in side view, Fig. 2 shows a top view of the mechanical drive and clockwork portion of the apparatus as seen from plane 2—2 of Fig. 1 in the direction of the arrows, Fig. 3 shows a cross-section of the liquid pump of the apparatus, taken in the plane 3—3 of Fig. 1 and seen in the direction of the arrows, Fig. 4 shows a top view of inner parts of the apparatus after the removal of the indicating device, some parts being shown in sectional view as seen from the plane 4—4 in Fig. 1 in the direction of the arrows, Fig. 5 shows the distribution valve of the apparatus in an enlarged view similar to that of Fig. 1 and in the rotational position shown in Fig. 6B, and Figs. 6A to 6G show each the cross-section of the valve, taken in the plane 6—6 of Fig. 5 in its different operating positions.

In the apparatus for measuring rotational speeds shown in the drawings, the driving shaft 11, Fig. 1, extends from above into a casing 12, wherein it is rotatable on the ball bearings 13 and 14. The said shaft carries a keyed bevel gear 15 engaging a bevel gear 16 mounted on a shaft 17 rotatable on the casing at right angles to the shaft 11. If the shaft 11 and the bevel gearing 15, 16 were omitted, the shaft 17 could enter the casing directly from the rear and serve as a driving shaft. The shaft 17 drives, by way of the spur gears 18, 19 and a shaft 20, a further spur gear 21, mounted on the last mentioned shaft and engaging a spur gear 22. This latter gear is rotatable on a support 23, which is free to rotate about the shaft 20, and acts as a mechanical rectifier by either engaging a spur gear 24 or a spur gear 25 engaging spur gear 24. When being swung about the shaft 20 in the direction of arrow "a" (Fig. 2) spur gear 22 engages the spur gear 24 directly, whereas, when being swung about shaft 20 in the direction of arrow "b," spur gear 22 will engage spur wheel 25 which is permanently engaged to spur gear 24. Thus the spur gear 24 will always be driven in the same sense of rotation (clockwise in Fig. 2) independently of the sense of rotation of the driving shaft 11. The spur gear 24 is fixed to a shaft 26 which is used on the one hand to wind up a driving spring (not shown) located in the spring chamber 270 of a timing or clockwork mechanism 27 located in the casing 12, and which on the other hand extends into a casing 29 fixed to the casing 12 by means of screws 28. In the casing 29, this shaft 26 is used to drive, with a rotational speed proportional to the speed of the driving shaft 11, an eccentric piston pump by means of a wheel 30 engaging a toothed rim 32 provided on a rotor 31 of the said pump.

The rotor 31 is provided with five equal radial cylinder borings 33 (see also Fig. 3) each provided with a piston 34 projecting beyond the periphery of the rotor 31. A helical spring 35 presses upon the inner side of each piston so that it abuts with a ball 37 partly projecting from the hollow outer end 36 of the piston against the cylindrical inner surface of an eccentric ring 38 the axis of which is parallel to that of the rotor. Thus the piston 34 performs during each revolution of the rotor a complete suction and discharge movement with a stroke having a length of twice the eccentricity. The eccentric ring 38 comprises a flange 39 having two guiding grooves 40 extending in the direction of the eccentricity and cooperating each with a lug 41 of a member 42 fixed to the casing 29. The eccentric ring abuts under the pressure of a helical spring 43 against an adjusting screw 45 screwed into the threaded boring 44 provided in the casing 29 and accessible from the outside upon the removal of a cover screw 46 from the boring 44. The screw 45 serves for adjusting the eccentricity of the ring 39 and thus of the length of the piston stroke and consequently of the discharge capacity of the pump.

The rotor 31 is rotatable on a hollow cylindrical sleeve forming projection 47 of the member 42, and the cylindrical borings 33 of the rotor are provided each with a channel 48 extending towards the said sleeve 47. During a complete revolution of the rotor each channel 48 is, through consecutive angles of rotation of predetermined amount, cut off by the sleeve (see particularly Fig. 3), then connected during the suction period of the piston 34 with an arcuate groove 49 in the outer surface of the sleeve, giving access through a groove 50 (Fig. 1) to the liquid containing cavity of the liquid-tight casing 29, then again cut off by the sleeve 47 and finally communicating during the discharge period of the piston 34 through a radial slot 51 in the sleeve 47 with the valve cavity 52 of a rotary valve. This rotary valve comprises a sleeve-shaped valve body 53 rotatable in the bering 54 of member 42 and the sleeve 47 and provided with two inlet openings 55 permanently interconnecting the radial slot 51 through a circumferential groove 56 in the cylindrical outer surface of the valve body 53 with the valve cavity 52.

The open end of the sleeve of the valve body 53 projects from the sleeve 47 and is provided in flange like arrangement with a six slot star wheel 57 resembling a Geneva wheel and engaged by a pin wheel 59 (Fig. 1) carrying six pins 58. The pin wheel 59 is mounted on a shaft 60 driven by the clockwork 27 and extending from the casing 12 into the casing 29, the pin wheel 59 for each complete revolution imparting to the rotary valve body 53 an intermittent rotary motion composed of six rotational steps.

The clockwork 27 (Figs. 1 and 2) comprises to this end in known manner on shaft 60, which is driven from the toothed periphery of the spring casing 270 over a gear wheel 271, an anchor wheel 272 the rotational movement of which is interrupted six times during each revolution by the anchor 274 cooperating with the balance 273. The spiral spring of the balance 273 is designated by 275.

The member 42 (Figs. 1 and 4) is attached to the casing 29 by means of three screws 61 and is provided with three borings 62, 62' and 62" extending radially from the valve boring 54 at angles of 230°, each boring opening at its outer end into the cavity 63 (or 63' or 63") of a cylindrical sleeve 64 (there being three in number) through an opening 65 in the sleeve wall. The three receiving spaces or measuring chambers 62 and 63, 62' and 63', and 62" and 63" are of equal design. Each sleeve 64 is mounted with its bottom end 66 on the member 42 and projects with its remaining portion over the member 42. A second cylindrical sleeve 67 (for each cylindrical sleeve 64) is mounted in displaceable manner on the cylindrical outer surface of the said projecting sleeve portion and is subject to the pull of the helical spring 68 hooked on the one hand to an anchoring ring 69 fixed to the sleeve bottom 66 and on the other hand to an anchoring ring 71 fixed at the bottom 70 of sleeve 67, the said spring urging the sleeve 67 to a normal position in which the flange 72 of sleeve 67 abuts against an adjusting screw 73 screwed into the member 42 parallel with the axis of sleeve 67. The axes of the three pairs of sleeves 64, 67 are in a common plane vertical to the axis of the rotary valve and define together an equilateral triangle through the center of which the axis of the rotary valve passes. A passage opening 74 in the valve body 53 interconnects the valve cavity 52 at times with one of the borings 62 or 62' or 62" in member 42, while an axial outlet groove 75 arranged in the cylindrical outer surface of the valve body 120° ahead of said opening 74 communicates at the same time with another of the three borings, i. e. boring 62' or 62" or 62 and opens into the cavity of the casing 29.

In order to variably define the valve cavity 52 against the open end of the valve body 53, the latter houses, as shown in Fig. 1 and, on a larger scale, in Fig. 5, a coaxial equalization piston 76 upon which is exerted the pressure of a helical spring 77 abutting against the part 78 threaded into the open end of the valve body 53 and urging the convex face of the piston 76 against the sleeve bottom of the valve body 53. The part 78 serves as an axial stay for the valve body on the casing 29 and is perforated so as to permit, during the displacement of the piston, the influx and the outflow of the liquid on the open end of the valve body 53.

A bearing plate 81 (Fig. 1) is fixed by means of a screw 80 in a circular recess 79 of member 42, the said recess being coaxial with the axis of the valve, and the bearing 82 which is also coaxial with the axis of the valve carries a rotatable feeler or scanning disc 83 provided with three pins 84 arranged in parallel to the axis of the pivot and at equal distances from one another on a circle whose center coincides with the said axis, the said pins each being arranged to contact by means of their cylindrical surface with the face 85 of the flange 72 of one of the sleeves 67. When the feeler member 83 rotates the axis of each pin 84 moves on a cylindrical surface intersecting the axis of the sleeve 67 at two separated points (shown in Fig. 4 on the upper left cylinder) with-in the range of rotation of the feeler member. This member is provided at its rim with an arcuate toothed segment 86 having its center on the axis of the disc and engaging a pinion 87, the shaft 88 of said pinion extending through a cover 90 fixed on the casing 29 by screws 89 and carrying at its outer end a spur gear 91. A pinion 92 gearing with the spur gear 91 is mounted on a shaft 93, which projects from the cover 90 of the casing and is provided with a hub 94 extending through an aperture 95 in the dial 96 and carrying a pointer 97 fixed by means of a screw 98. The box 99 containing the dial 96 is mounted on the casing 29 by means of screws 100 and is provided with a cover glass. A spring 103 attached to a lug 102 of the cover 90 of the casing 29 acts upon the hub 94 in order to hold over the gearing 92, 91, 87 and the toothed segment 86 at a time at least one of the pins 84 in contact with the flange 72 of that sleeve 67 which shows the greatest stroke at this moment or to hold all three pins 84 in contact with their corresponding sleeves 67 if the instrument is at rest. The said spring thus acts as a restoring spring for the pointer 97. In order to prevent an overstepping of the measurement capacity of the apparatus the sleeves 64 are provided each with two safety openings 104 which become uncovered to communicate with the cavity of the casing 29 as soon as the stroke of the sleeve 67 reaches its maximum.

The apparatus described hereinbefore operates as follows:

Referring to Fig. 3 the rotation of the rotor 31 of the eccentric piston pump caused by the driving shaft 11 through the gearing parts 15, 16 to 22, 24 and eventually 25, as well as 26 and 30 is, due to the mechanical rectifier 21, 22, 24 or 21, 22, 25, 24, always clockwise in Fig. 3 and has a rotational speed which is proportional to the rotational speed of the driving shaft, and the quantity of liquid discharged by this pump per unit of time is an exact measure for the rotational speed of the driving shaft. Through the action of the spring 35, each piston 34 in turn sucks from the arcuate groove 49, which latter communicates with the cavity of the casing 29 and the liquid therein, a quantity of liquid into the cylinder 33 and discharges this quantity after the passing of that portion of the sleeve 47 cutting off the channel 48, into the radial slot 51 which latter is connected by the annular groove 56 and the inlet openings 55 with the cavity 52 of the valve 53.

The valve body 53, driven clockwise by the clockwork 27, performs a complete revolution in six rotational steps in successive pairs which are of predetermined equal duration whereas the two successive steps of each pair may deviate somewhat from one another with respect to their duration and the angle of rotation due to the well-known anchor construction of the clockwork 27 indicated but in general lines in Fig. 2. At each rotational step the valve body 53 is accelerated from rest to a maximum speed and then slowed down to rest. The Figs. 6A and 6C to 6G show the position of the valve body 53 at the end of each of the six rotational steps of the said body and Fig. 6B shows an intermediate momentary position of the valve body during the rotational step following immediately the operating position shown in Fig. 6A. Let it be assumed with reference to this latter figure and for the explanation of the functioning of the rotary valve as a switching member serving the liquid measuring chambers or receiving spaces 62, 63; 62′, 63′ and 62″, 63″ during a complete revolution over 360°, and that the angular position of the first of the three borings 62, 62′, 62″ is 30°, that of boring 62′ 150° and that of boring 62″ 270°. With these angular positions the valve body 53 will reach its maximum speed during the six rotational steps when the center of the opening 74 reaches the positions 30°, 90°, 150°, 210°, 270° and 330° with respect to the axes of the borings 62, 62′ and 62″. The opening 74 provides a fully opened passage to the borings 62, 62′ and 62″ in the positions 30°, 150° and 270° but is completely closed in the positions 90°, 210° and 330° by the wall of member 42 which bridges the rim of opening 74 sufficiently to warrant a tight closure of the valve. The liquid discharged by the pump during this complete closure of the opening 74 (Figs. 5 and 6B) displaces the equalization piston 76 against the pressure exerted by spring 77 and is for a short period stored in the valve cavity 52 until it is discharged, on the next opening of the passage 74 (Fig. 6C), by the spring-controlled piston 76 to the receiving space now in turn and, of course, together with the quantity of liquid dispatched by the pump whilst the passage is open.

The liquid entering into the receiving space 62, 63 causes against the pull of spring 68 the space 63 to increase by a displacement of the sleeve 67 on the sleeve 64. At the same time the outlet groove 75, leading the opening 74 by 120°, communicates with the receiving space 62′, 63′ which returns to its normal volume as the pull of its spring 68 returns the sleeve 67 to its normal position, whereas the receiving space 62″, 63″ remains closed from the moment when the opening 74 has left the outlet of boring 62″ to the moment when the outlet groove 75 starts to communicate with this boring 62″. Thus, due to the six rotational steps of the valve body 53 as per Figs. 6A to 6G the receiving spaces will in turn communicate through the opening 74 with the dispatching side of the pump, then be closed by the valve body 53 and finally communicate through the outlet groove 75 with the cavity of the casing 29. The position of the feeler member or scanning disc 83 (Fig. 1 and 4) depends at any moment on the stroke or position of the sleeve 67 of the three receiving spaces which has the greatest stroke at that particular moment. The rotary motion or angular position of said feeler or scanning disc 83 is transferred over the gearing parts 86–88, 91, 92 and 94 to the pointer 97 which indicates the measured value on the properly calibrated scale of the dial 96. The scanning of the volumetric condition of the receiving spaces provides a measure for the quantity of liquid dispatched by the pump during the inlet periods which are of equal length, the said quantity being in turn proportional to the rotational speed.

There could be more than three receiving spaces and the axes of displacement of the associated sleeves 67 could all be at an equal angle with respect to a certain plane and be arranged in such a way that the vertical projection of said axes on said plane defines an equilateral polygon.

Instead of having the driving shaft introduced, as shown in Fig. 1, at the top of the casing 12, it could be introduced on a side or the bottom thereof.

Several scales could be provided on the dial 96, the said scales being each calibrated for a particular value of the eccentricity of the pump.

The apparatus could also be designated as an insert unit without a dial but comprising means for connecting a transmission shaft leading to a suitable indicating device as well as means for driving it by any shaft the rotational speed of which is to be measured.

By the mounting of the pump, the control valve and the measuring system in a liquid tight casing or container provided with a liquid containing cavity with which the pump and the measuring system communicate, a number of advantages are obtained, including the following:

(1) The complete lack of any tubing between the different parts of the measuring system and between this system and the container, and consequently the elimination of liquid-tight joints which would be necessary otherwise;

(2) Self-lubrication of all parts of the measuring system without the necessity of special lubrication means since the oil forming the liquid medium acts itself as lubricant;

(3) Practically no wear of the said parts since they are completely immersed in the oil used as liquid medium;

(4) Full mechanical protection of the measuring system by the casing forming the container;

(5) Full protection of the measuring system against dust and humidity; and (6) Extreme compactness of the instrument.

We claim:

1. An apparatus for measuring rotational speeds comprising a liquid pump discharging proportional to the said rotational speed, a distributor valve adapted to be periodically operated, means providing a plurality of receiving spaces, said liquid pump communicating on the discharge side through the periodically operated distributor valve alternately during time intervals of predetermined and equal duration with the plurality of spaces provided by said means for measuring the amount of liquid pumped per time interval, each of said spaces being volumetrically variably defined by a pair of relatively displaceable telescoping bodies, the telescoping bodies of the body pairs being arranged so that the projection of their axes of displacement on a common plane define an equilateral polygon, and a scanning member rotatable by said bodies upon volumetrical variation of the receiving spaces and having its axis of rotation vertical to the said plane and passing through the center of said polygon.

2. The apparatus of claim 1 in which the displaceable bodies of the body pairs have their axes of displacement in a common plane.

3. The apparatus of claim 1 in which the said receiving spaces comprise three receiving spaces of which the three bodies are arranged each along one side of an equilateral triangle in displaceable manner on a cylindrical portion of a single stationary body.

4. The apparatus of claim 1 in which the pair of relatively displaceable bodies comprise a stationary body and a displaceable hollow cylinder.

5. The apparatus of claim 4 in which each receiving space encloses a restoring spring connected on the one hand to the displaceable hollow cylinder and on the other hand to the stationary body, the said spring tending to return the hollow cylinder into a normal position.

6. An apparatus as claimed in claim 4 in which each hollow cylinder comprises an outer surface transverse to the axis of displacement and provided to cooperate with the scanning member and contacting therewith as long as no other hollow cylinder is occupying a stroke position farther away from the normal position than that of the first mentioned hollow cylinder.

7. An apparatus as claimed in claim 4 in which an adjustable stop is provided to fix the normal position of the said hollow cylinder.

8. An apparatus as claimed in claim 1 in which the distributor valve is a rotary valve having its axis passing through the center of the polygon and vertically to the plane containing the axes of displacement of the body pairs.

9. An apparatus as claimed in claim 1 in which a chamber connects the pump and the valve and in which in order to define volumetrically variably the chamber filled with the pumped liquid between the discharge side of the pump and the opening of the rotary valve alternately communicating with the receiving chambers, a movable equalization member is provided which is subject to a load member tending to keep the said equalization member in a normal position limiting the said space to a minimum volume.

10. An apparatus as claimed in claim 9 in which the said equalization member comprises a spring-controlled piston arranged in the rotary body of the rotary valve and co-axially displaceable along the axis of the valve.

11. An apparatus as claimed in claim 1 in which the valve is rotatably connected compulsorily with a rotary member driven in rotational steps by means of a clockwork, a complete revolution of the valve comprising a number of steps equal to the number of receiving chambers multiplied with an integral number.

12. An apparatus as claimed in claim 1 in which the valve is rotatable and in which the chambers comprise three in number and in which a complete revolution of the valve is composed of six rotational steps in pairs of two successive steps of predetermined and equal length.

13. An apparatus as claimed in claim 1 in which the passage opening provided in the valve body to communicate alternatively with the receiving spaces is so arranged in the said body as to maintain during one of two successive rotational steps a connection between the discharge side of the pump and one of said receiving spaces, and as to disconnect the pump from said one of the receiving spaces during the other rotational step.

14. An apparatus as claimed in claim 1 in which the valve, the bodies containing the receiving spaces and the scanning member are arranged in a liquid-tight casing through the wall of which passes a shaft driving the pump, a clockwork shaft driving the valve and a shaft transferring the rotation of said member to the outer side of the casing.

15. An apparatus as claimed in claim 14 in which the shafts passing through the wall of the liquid-tight casing are parallel to one another and eccentric with respect to the axis of the valve.

16. An apparatus as claimed in claim 1 in which the scanning member is movably connected to a resilient restoring member holding the scanning member in contact with the displaceable body of that pair of bodies which defines the momentarily greatest receiving space.

17. An apparatus as claimed in claim 16 in which the surface of the scanning member provided to contact with the outer surface of the displaceable body is a rotational surface, the axis of which is intersecting the axis of the displaceable body within the range of rotation of the scanning member in two positions of the latter.

References Cited in the file of this patent

UNITED STATES PATENTS

| 2,229,681 | Sorensen | Jan. 28, 1941 |
|-----------|----------|---------------|
| 2,582,727 | Wahli | Jan. 15, 1952 |
| 2,695,776 | Burg | Nov. 30, 1954 |
| 2,752,145 | Hill et al. | June 26, 1956 |